United States Patent [19]

Haraikawa

[11] 4,072,216
[45] Feb. 7, 1978

[54] DISC BRAKE GUIDING AND SUPPORT STRUCTURE

[75] Inventor: Tetsuo Haraikawa, Funabashi, Japan

[73] Assignee: Tokico Ltd., Kawasaki, Japan

[21] Appl. No.: 713,037

[22] Filed: Aug. 10, 1976

[30] Foreign Application Priority Data

| Aug. 14, 1975 | Japan | 50-98822 |
| Aug. 14, 1975 | Japan | 50-98824 |
| Aug. 14, 1975 | Japan | 50-98825 |
| Aug. 14, 1975 | Japan | 50-112188[U] |
| Aug. 14, 1975 | Japan | 50-112189[U] |

[51] Int. Cl.² ........................................ F16D 55/224
[52] U.S. Cl. ................................ 188/73.3; 188/73.6
[58] Field of Search ................... 188/73.3, 73.4, 73.5, 188/73.6, 72.4

[56] References Cited

U.S. PATENT DOCUMENTS

| 3,384,203 | 5/1968 | Walther et al. | 188/73.6 X |
| 3,388,774 | 6/1968 | Burnett | 188/73.5 |
| 3,592,301 | 7/1971 | Auth | 188/73.6 |
| 3,625,316 | 12/1971 | Mori | 188/73.5 |
| 3,881,576 | 5/1975 | Haraikawa | 188/73.5 |
| 3,887,045 | 6/1975 | Dettoff et al. | 188/73.3 |
| 3,889,785 | 6/1975 | Hori | 188/73.3 |
| 3,976,169 | 8/1976 | Ogawa | 188/73.3 |
| 3,977,498 | 8/1976 | Ogawa | 188/73.3 |

*Primary Examiner*—George E. A. Halvosa
*Attorney, Agent, or Firm*—Schmidt, Johnson, Hovey & Williams

[57] ABSTRACT

A disc brake of a floating caliper type, in which a pair of slide bolts are provided along the circumference of a disc in spaced relation from each other, and a pair of wall portions are provided so as to cover the sides of the aforesaid slide bolts but in spaced relation from each other along the circumference of the disc.

9 Claims, 12 Drawing Figures

DISC BRAKE GUIDING AND SUPPORT STRUCTURE

This invention relates to a disc brake, and more particularly to a disc brake of a floating caliper type, in which a caliper is axially slidably supported along the axis of the disc by a bracket or support which is a stationary member and secured to a non-rotatable portion of a vehicle, and the caliper is guided by means of bolts or pins in slidable relation in the axial direction, the aforesaid bolts being provided in the caliper and extending through axial holes provided in the bracket.

Various types of discs of this kind are known such as disclosed in U.S. Pat. No. 3,656,590 and U.K. Patent No. 1,079,911, in which a caliper is divided into two housing members; a pair of axial bolts are provided along the circumference of a disc for interconnecting the aforesaid both housing members integrally; and the respective bolts are slidingly fitted in axial holes in the bracket. With the disc brake as shown in the specifications of the aforesaid patents, the contacting areas of coupling portions of the aforesaid both housing members are small, so that both housing members are subjected to deflection due to a force exerted thereon, when the bolts are tightened, thus causing slight bending of the bolts, presenting causes for insufficient and/or irregular sliding movement of the caliper. For minimizing the deformation of bolts and a caliper, it is required to increase rigidity of a caliper. This leads to an increase in weight of the caliper and hence is not economical.

On the other hand, with most of the floating caliper type disc brakes, in which a disc is sandwiched between a piston-side pad and an arm-side pad for a braking action, the piston-side pad is directly housed in a support secured to a vehicle, while the arm-side pad alone is directly attached to the housing. Thus, upon braking, the braking force of the piston-side pad is directly transmitted to the support rather than through the housing, while the braking force of the arm-side pad is transmitted to the support through the medium of the arm and slide bolts. (U.S. Pat. No. 3,881,576 and U.K. Patent No. 1,079,911) On the other hand, a disc brake of the type, in which a piston-side pad and an arm-side pad are directly housed in a support, is known. (U.S. Pat. No. 3,656,590)

With known disc brakes, at least one of the pads is attached to the supporting surface of a support, and the pad is required to slide on the aforesaid supporting surface of the support to press a disc. For this reason, the sliding movement of the pad should be smooth, so that the surface of the support which contacts the pad should be subjected to a precision machining such as broaching or milling. The machining of a support dictates the use of two steps — a multiple-axia drilling operation for drilling the other parts of the aforesaid contacting surface of the support, and a precision machining operation for machining the contacting surface of the support. This adversely affects the economy of a support member.

As is well known, disc brakes of this type may be classified into two types from the viewpoint of the construction of the caliper housings, i.e., (i) a non-split type, in which the housings are formed integrally, and (ii) a split type, in which a housing is divided into two housing components.

The disc brake having a housing of a non-split type permits easy assembly and provides high strength in construction, but difficulty arises in machining of the interior of the housing. On the other hand, the disc brake of a split type permits easy machining of the interior of a housing, but is inferior in strength and readiness in assembly to a non-split type.

Disc brakes of a split type are disclosed in the U.S. Pat. Nos. 3,656,590 and 3,881,576. According to the known split type disc brakes, a pair of axial bolts positioned in a spaced relation from each other along the circumference of a disc fasten housing components together at the opposite ends of the housing, while middle portions of bolts are slidingly fitted in holes provided in a support. The shortcomings in the disc brake of this type lie in that the contacting areas of the two housing components are small, so that a bending stress is exerted on bolts, upon tightening of housing components by bolts and upon a braking operation, and thus the bolts are bent inwardly or outwardly slightly. The bending of bolts is attributable to the failure to achieve a smooth sliding movement of the caliper. It follows from this that, to prevent bending of the bolts, for achieving smooth sliding movement of the caliper rigidity of a caliper should be increased. However, a simple increase in thickness or an increase in area of the contacting surfaces of housing components can not directly lead to the intended improvements. Either results in increases in caliper weight as well as in cost. In addition, the amount of pressure oil to be fed to a piston is increased, with the result that the stroke of a piston should be increased. In addition, a disc brake is known, in which there is provided an opening in a housing, into which pads are to be placed. The most remarkable shortcoming in a split type disc brake is that part of the contacting surfaces of the housing components is biased outwardly of the bolts, so that the bolts tend to be bent outwardly or inwardly, upon tightening of the housing components by bolts or upon a braking operation, thereby hindering smooth operation of a caliper. To avoid this shortcoming, it has been suggested that contacting surfaces be provided in the inner sides of bolts. This is effective when applied to a caliper free of an opening for a pad, which opening is provided in the upper portion of a housing, i.e., a caliper of a cover type, has proved to be of little or no advantage, when applied to a non-cover type caliper which has an opening in an upper portion of a housing for facilitating replacement of the friction pads. This is because, in the case of a non-cover type caliper, upon a braking operation, the housing components on the side of an arm are deformed into a concave form, so that the abutting surfaces of both components tend to be drawn inwardly, and thus the bolts in this position are subjected to inward stresses and thus deformed. This hinders the smooth sliding movement of the caliper. As a result, the amount of pressure oil is increased upon a braking operation, with the accompanying lowering in braking performances. In addition, the weight of the housing components is increased, because of an increase in thickness of the housing components, and because of the provision of reinforcing ribs for preventing deformation of the housing components.

Still furthermore, with the top open type disc brake which allows friction pads to be placed in or removed from an upper portion of a housing in the disc brake, it is mandatory that the disc brake supporting means be simple in construction so as to facilitate attachment of the supporting means as well as replacement of the pads. In addition, the supporting means mechanism should be of a type that insures the positive attachment of the supporting means. If a disc brake fails to meet the aforesaid requirements, the supporting means will offset the advantage of an open top type disc brake which presents simplicity in replacement of pads, and fails to achieve the intended braking operation of a brake.

Many kinds of pad supporting means have been proposed to achieve the aforesaid purposes. According to the knowledge of the inventor, these attempts are all directed to providing pins which pad backing plates, and pins adapted to support the pad backing plates slidingly, or to resiliently support pad backing plates and a housing or caliper, thereby bringing these members such as pads, a pin and housing, into a stable assembled condition. For this reason, an elastic force of the supporting means can not be successfully exerted on the respective parts. In addition, in the event of wear of pins or of pin receiving holes in the pads, the supporting means can not compensate for such wear, thus presenting cause for producing vibration in pads with accompanying noise, upon running of a vehicle or a braking operation. Still furthermore, with the prior art disc brake, if wear takes place in pins, a clearance results between the pins and housing. This hinders the normal sliding movement of the housing, and results in only partial contact between the pads and brake, thereby accelerating wear in parts and leading to the failure in achieving a smooth braking operation.

With another type of known pad supporting means, the supporting means is made of a strong elastic material to avoid the aforesaid shortcomings. However, this leads to difficulty in assembly, thus requiring an expenditure of much time and effort for assembly of the disc brake. With still another type supporting means, the supporting means is made of a flat spring material, so that inspection for wear in pads dictates the removal of the supporting member by withdrawing pins therefrom. For this reason, the pads remain free of checking for wear, until there takes place an abnormal condition in the brake feeling. As a result, satisfactory maintenance for pads can not be conducted, thus presenting danger of an accident.

With still another type pad supporting means, of which the inventor has a knowledge, in case the supporting means is used in a disc brake in which reinforcing ribs are provided on the inner sides of guide pins adapted to guide a caliper sliding, the supporting means only contacts the aforesaid ribs, so that it is required to provide a cover separately, for preventing sliding portions of the guide pins from damage due to impact of bouncing stones. This requires an extra step of attaching a cover for a brake upon assembly of a brake.

It is an object of the present invention to provide a disc brake having a split type caliper, which caliper has increased rigidity without any increase in weight for minimizing deformation of bolts and a caliper.

It is another object of the present invention to provide a disc brake, in which two pads arranged on the opposite sides of the disc are directly attached within a housing, thereby eliminating the need for a precision machining operation to insure smooth sliding of pads within the support.

It is a further object of the present invention to provide a non-cover type disc brake having a split type housing, in which the abutting surfaces of both housings are prevented from being drawn inwardly, upon a braking operation.

It is a still further object of the present invention to provide a pad supporting means, in which one pad supporting means directly acts on pads, a pin and a housings, thereby achieving the intended function of the means, and may follow or compensate for wear in pin receiving holes in pads, thereby preventing the vibration and noise which stems from the aforesaid wear, and in which the entire surfaces of pads are maintained in uniform contact with the entire surfaces of a disc, thereby presenting a smooth braking operation at all times.

It is still a further object of the present invention to provide a pad supporting means which is easily attached and assembled, despite the use of strong elastic material.

It is a further object of the present invention to provide a pad supporting means with which the wear of pads may be observed without removing the pad supporting means.

It is a further object of the present invention to provide a pad supporting means in a disc brake having reinforcing ribs on the inner sides of caliper guiding pins, in which a cover for protecting the sliding portions of guide pins is dispensed with.

These and other objects and features of the present invention will be apparent from a reading of the ensuing part of the specification in conjunction with the accompanying drawings which indicate embodiments of the invention, in which.

Figure 1:
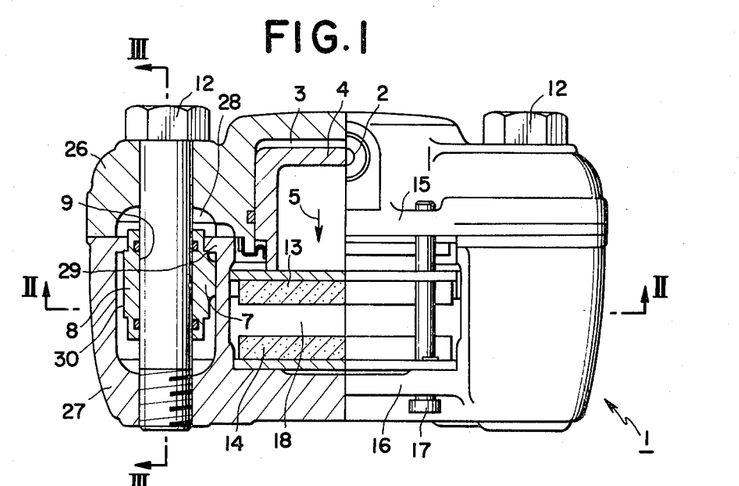
FIG. 1 is a top view, partly broken, of the first embodiment of the invention.
Figure 2:
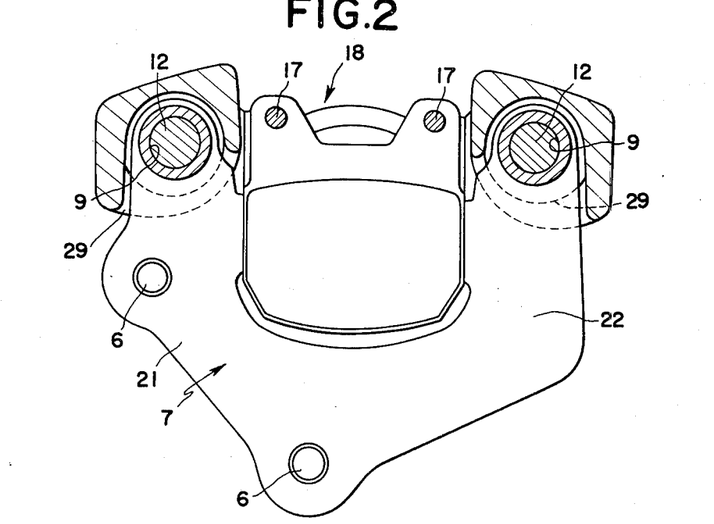
FIG. 2 is a cross-sectional view taken along the line II—II of FIG. 1.
Figure 3:
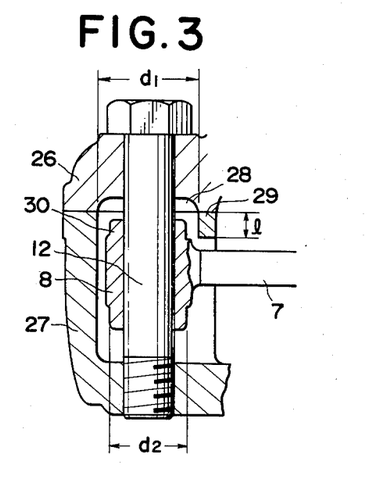
FIG. 3 is a cross-sectional view taken along the line III—III of FIG. 1.

Referring to FIGS. 1 to 3, a caliper 1 consists of two housing components 26,27. The two housing components are fastened together by means of two bolts 12,12 positioned in spaced relation from each other along the circumference of a disc (not shown). A support 7 substantially of 'Y' shape, which is secured to a stationary portion (not shown) of a vehicle by means of attaching holes 6,6 and suitable means is slidably supported by the middle portions of the bolts 12,12. Positioned within a space surrounded by lefthand and righthand arms 21,22 of the support 7, i.e., in the center portion of the support 7 are pads 13,14 which are positioned in opposing relation to the disc. In contact with the back surface of the pad 13 is a piston 4 which moves within a cylinder 3 provided within the housing component 26. A pad 14 is positioned in the front of the pad 13 through the medium of a disc. The pad 14 is attached to the housing component 27 according to a known method. Holes are provided in the upper, opposite side portions of the backing plates of the pads 13,14 for receiving pins 19,19 therein, while pads are supported by pins 19,19 in suspending relation. Pins 19,19 span between ribs 15 and 16 provided for the housing components 26,27, and may be withdrawn as required, so that the pads may be placed into or taken out from an opening 18 provided in the top surface of the housing 1.

As clearly shown in FIGS. 2 and 3, the surfaces of the housing component 27 abutting with the housing component 26 are provided by cylindrical portions 29,29, through which the bolts 12,12 extend. The inner diameter $d1$ of the cylindrical portion 29 is larger than the outer diameter $d2$ of an annular projecting portion 30 provided in upper portions 8,8 having bolt-receiving holes therein, the aforesaid upper portions being positioned in the edge portions of the arms 21,22 of the support 7.

With the disc brake according to the present invention, when a driver effects a braking operation, pressure oil is supplied from a given pressure oil source into the cylinder 3 through a pressure oil supply port 2 provided in an upper portion of the housing 1. The piston, due to supply of pressure oil, moves towards the disc in the direction of arrow 5. On the other hand, the housing 1 moves in the direction against the direction of arrow 5 relative to the support 7 due to a reaction of the piston 4 against the pressure of pressure oil, with the holes 9 being guided by bolts 12,12 which extend through holes 9,9 provided in the upper portions 8,8 of the support 7 and have their opposite ends piercing through the housing components 26,27. In this manner, the disc is pressed by the pad 13 which is pressed by the piston 4 on its one side, and by the pad 14 on the other side, so that suitable braking may be achieved.

According to the present invention, the abutting portions of the housing components 26,27 are formed into a cylindrical shape, through which bolts 12,12 extend, i.e., a cylindrical portion of one component abuts a cylindrical portion of the other component. As a result, even if bolts 12,12 are tightened strongly or even upon braking operation, the cylindrical portion of one housing component contacts the bolts 12,12 through cylindrical surfaces thereof, so that stress produced in one housing will not be biased. As a result, there is no possibility of bolts causing bending, other than elongation. For this reason, a linear movement of the housing 1 may be achieved at all times, thereby allowing a smooth movement of the housing. Or, as an alternative, the component 26 may be formed with a cylindrical concave portion 28 as shown in FIGS. 1 and 3.

In addition, the outer diameter $d2$ of the annular projecting portion 30 of the support 7 is smaller than the inner diameter $d1$ of the cylindrical portion 29 of the housing. This aids in minimizing the axial length of a caliper. If the inner diameter $d1$ is smaller than the outer diameter $d2$, then the projecting portion 30 can not make ingress into the cylindrical portion 29, resulting in an increase in length of the caliper by a length '$l$' of the cylindrical portion, as best shown in FIG. 3. With a positional relationship between the housing 1 and the support 7 being as shown in FIG. 3, the position of the support 7 is biased to the left (FIG. 3) relatively, with an increase in wear in the pad 14, so that it is required upon initial location of the annular projecting portion 30 that the projecting portion 30 be set as deep in the cylindrical portion 29 as possible, as readily understood by those skilled in the art.

Figure 4:
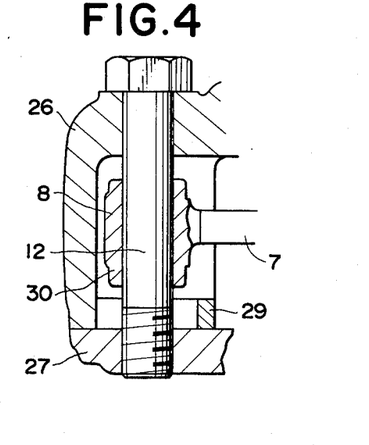
FIG. 4 is a view similar to that shown in FIG. 3, showing another embodiment of the invention.

FIG. 4 is a view of another embodiment of the invention, in which a cylindrical portion 29 is provided on a housing component other than that shown in FIG. 3. This embodiment may well compensate for leftward movement of the support 7 due to wear in a pad.

According to the disc brake of the invention, the abutting portion of one housing component with another is provided in the form of a cylindrical portion, through which bolts 12,12 extend, so that uniform transmission of stresses from one component to another may be achieved, thereby preventing bending in bolts, and hence insuring a smooth axial movement of the caliper. In addition, the diameter $d2$ of the annular projecting portion 30 of the support 7 is smaller than the inner diameter $d1$ of the cylindrical portion 29, thereby minimizing the axial length of the caliper.

Figure 5:
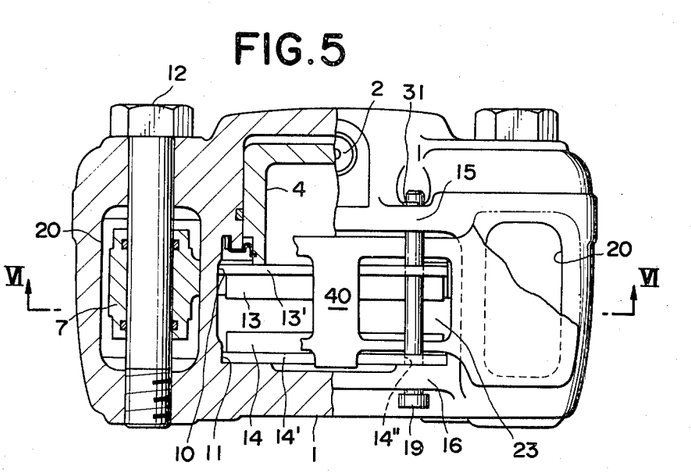
FIG. 5 is a view similar to that shown in FIG. 1, showing a third embodiment of the invention.
Figure 6:
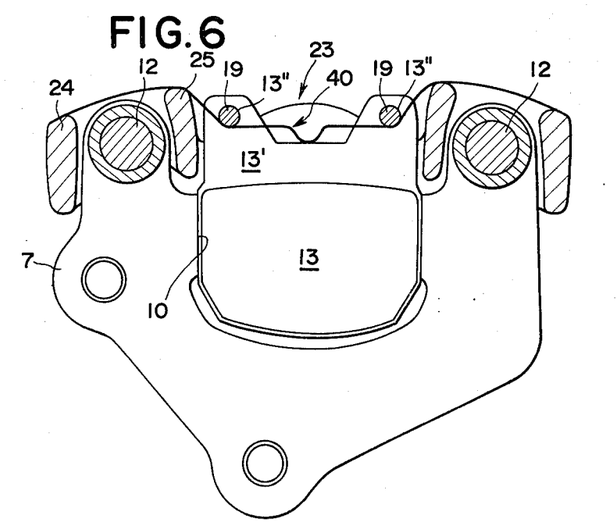
FIG. 6 is a cross-sectional view taken along the line VI—VI of FIG. 5.

FIGS. 5 and 6 show still another embodiment of the invention. The operation of a disc brake shown in FIGS. 5 and 6 is substantially the same as that of the first embodiment. Like parts are designated by like reference numerals throughout the FIGS. 1 to 6, and description will be given only of a difference in construction.

The pad 13 adapted to be directly operated is admitted in a concave portion 10 which is open upwards in FIG. 4, i.e., radially outwards of the support 7, thereby directly transmitting to the support a resisting force arising upon a braking operation. The pad 14 is admitted in a concave portion 11 provided in the caliper. A rectangular opening 23 is provided in the caliper 1 for allowing an upward removal of pads 13,14 therethrough. Pins 19,19 extending through holes provided in the backing plates 13',14' of the pads 13,14 retain the pads in given positions. Side walls 24,25 are positioned so as to surround peripheral portions of sliding portions of the support 7 along the side of bolts 12,12, thereby protecting the aforesaid sliding portions from damage due to dust and bouncing stones and increasing the ridigity and strength of the caliper. This permits application of tension to the bolts beforehand, without deforming the caliper. The inner side walls 25,25 are spaced from each other a distance which permits the removal of insertion of the pads 13,14 therethrough.

This prevents the caliper as well as the bolts, from bending upon a braking operation, with the accompanying reduction in weight of the caliper. In addition, this prevents the accidental sliding of the caliper due to bending of the bolts, and the occurance of abnormal wear and noise of pads.

Shown at 40 is a cover which covers a top opening defined by the walls 24,25, and the opening 23, as well. Shown at 31 is a cotter pin for use with the pin 19.

Figure 7:
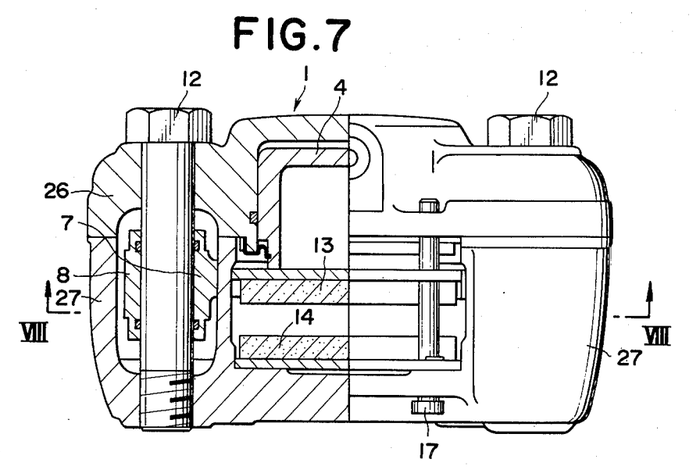
FIG. 7 is a view similar to that shown in FIG. 1, showing a fourth embodiment of the invention.
Figure 8:
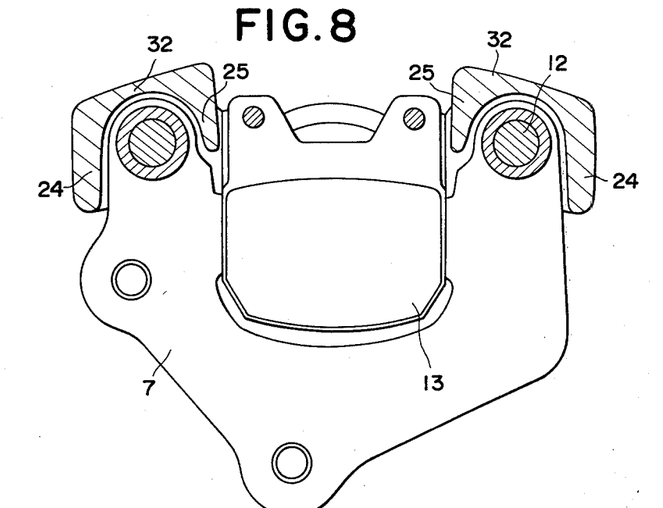
FIG. 8 is a cross-sectional view taken along the line VIII—VIII of FIG. 7.
Figure 9:
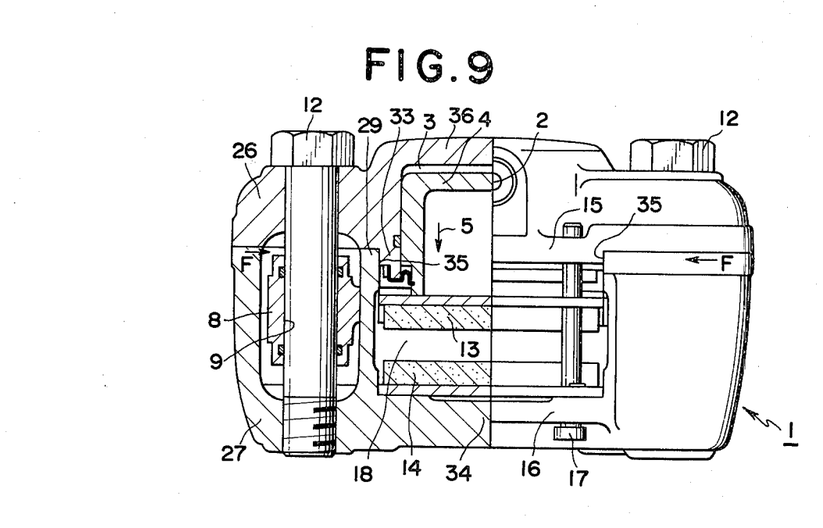
FIG. 9 is a view similar to that shown in FIG. 1, showing a fifth embodiment of the invention.

With yet another embodiment as shown in FIGS. 7 and 8, a caliper consists of spitable two housing components 26,27, while the side walls 24,25 are integral with a top wall 32, thereby forming a 'U' shaped concave portion which is open radially inwardly or downwards, and hence increasing the strength of this portion. The other parts are the same in construction as the second embodiment shown in FIGS. 7 and 8, the reference numerals being used in common therewith. FIG. 9 shows a further embodiment of the invention, while the operation thereof is substantially the same as that of the first embodiment, the reference numerals being used in common therewith.

As is clear from the drawing, the inner surface of the cylindrical portion 29 of the housing component 27 contacts the outer surface of the flange 33 defining a cylinder portion 3 in the housing component 26. Despite the fact that the opposite edge portions (which receive the bolts 12,12 therein) of the housing component 27 are drawn rearwards i.e., in the direction against an arrow direction 5, the central portion 34 thereof abuts a disc and is held thereat. As a result, inwardly directed forces F are produced along the contacting surface of the component with the component 26. These forces F tend to bend the bolts 12,12 inwardly. In other words, the bolts 12,12 receive an inwardly directed force F. The inwardly directed force in the component 27 is a rotational force acting about the portion 34, so that part of the aforesaid inwardly directed force may be offset by increasing the area of a contacting surface of the components, while a force which can not be offset appears as a force acting along the contacting surface, i.e., a shear acting on bolts. The repeated occurrence of the aforesaid phenomenon results in a loss in parallelism of the bolts 12,12 with the holes 9,9, with the resulting failure in a smooth sliding movement of the caliper.

Accordingly, the abutting surfaces of the housing components are provided in the form of surfaces 35,35 which are substantially parallel with the bolts, thereby completely offsetting the inwardly directed forces which have not been offset as described above. This may prevent a variation in amount of pressure oil due to deformation in the aforesaid components, thereby insuring a smooth braking operation. In addition, sliding of the component 26 relative to the component 27 may be prevented, with the resulting absence of a shear acting on the bolts, so that the diameter of bolts may be reduced. In addition, the provision of the surfaces 35,35 facilitates the location of the housing components 26,27 upon assembly, as well as preventing sliding of the housing in the direction perpendicular to the axis of the bolts 12,12, when tightened. Still furthermore, stresses acting on the central portion 34 or portion 36 may be minimized, so that the weight of these portions may be reduced.

The disc brake according to the present invention may be used for a disc brake of the type which is free of an opening 18, but presents a remarkable advantage in the application to a non-cover type caliper.

Figure 10:
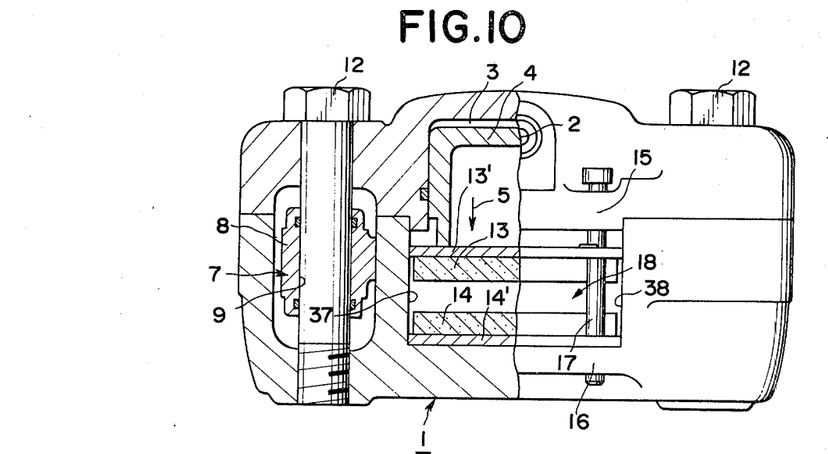
FIG. 10 is a view similar to that shown in FIG. 1, showing a sixth embodiment of the invention.

The embodiment shown in FIG. 10 eliminates a need to support at least one pad by a support by attaching the both pads to a housing, thereby avoiding a step of precision machining of the pad-abutting surfaces of the support, and facilitating the machining of a support member, with the accompanying improved economy.

The operation of this embodiment is similar to that of the first embodiment, and the reference numerals are commonly used therein.

In this embodiment, the support 7 is of a 'Y' shape, and the support has no portion to support the pad 13, as in the case of a disc brake as shown in FIGS. 1 and 5. In addition, the pad 13 is slidable, together with the pad 14, on the wall portions 37 and 38 which define an opening 18 provided between the ribs 15 and 16 of the housing 1. The pads 13,14, or, the backing plate portions 13',14', to be exact, are provided in such a way as to sandwich a disc therebetween in the opening 18, being supported by means of a pair of pins 17,17.

In the aforesaid braking operation, the pad 13 moves along the walls 37,38 in arrow direction 5 by being pressed by the piston 4, so that a braking force given by the pad 13 is directly transmitted to one of the wall portions 37,38, and from there by way of housing 1 and slide bolt 12 to the support 7. At the same time, the pad 14 is moved access to the disc in the direction opposite the arrow direction 5 due to the movement of the housing 1, thereby producing a braking force. The braking force given by the pad 14 is directly transmitted to one of the wall portions 37,38 (the same wall portion as in the case of the pad 13), and from there by way of the housing 1 and slide bolt 12 to the support 7. Accordingly, the braking forces produced by the two pads are transmitted by way of the slide bolts 12,12 to the support 7.

According to the present invention, the pads 13,14 are suspended in the opening 18 by means of pins 17,17 on the opposite sides of the disc, so that if the pins 17,17 are withdrawn as required, then the pads 13,14 may be readily withdrawn through the opening 18, thus facilitating the replacement thereof.

As is well known, there is at least one portion to admit a pad in a support member of a disc brake (mostly a pad on the side of a piston), and machining is required for providing a portion which is adapted to guide a pad being pressed by the piston in the direction of a disc, upon a braking operation. The aforesaid machining prevents vibration of pads or resulting noise, as well as slidingly guides the pads, so the precision machining work is required. For this reason, portions other than the pad-abutting surface, of the support member may be drilled by means of a multiple axis drilling machine and the like in one step. However, particular precision is required for the pad abutting surface of the support, so that there should be involved another step of machining the pad-abutting surface more precisely. As a result, there are required two steps of machining for the support member, thus presenting many problems to be solved in the precision machining, as compared with the machining of the other parts.

According to the present invention, the support member may be machined in a single step, and wall portions 37,38 defining an opening is formed so as to provide a greater length than those of the prior art wall portions, the other steps remaining unchanged. In other words, the abutting surfaces of pads 13 and 14 are jointly prepared on the wall portions 37,38, thereby dispensing with a machining work for the pad-abutting surface of a support for the pad 13 in particular, thereby facilitating the manufacture of the support member.

Figure 11:
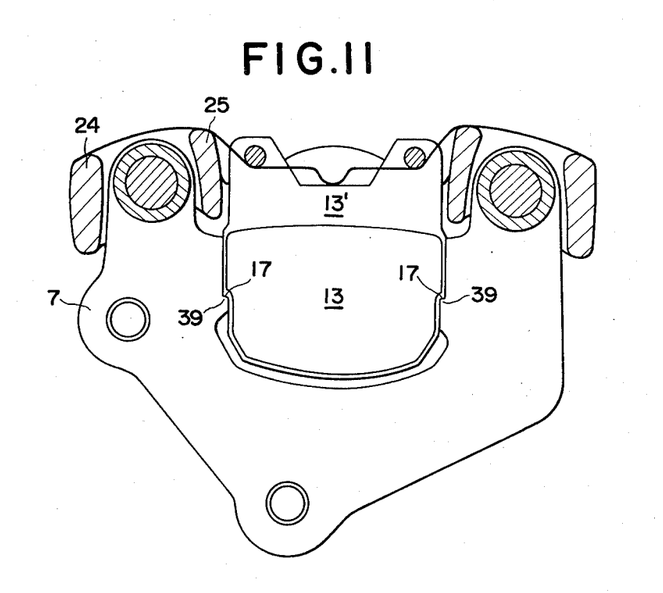
FIG. 11 is a view similar to that shown in FIG. 6, showing a seventh embodiment of the invention.
Figure 12:
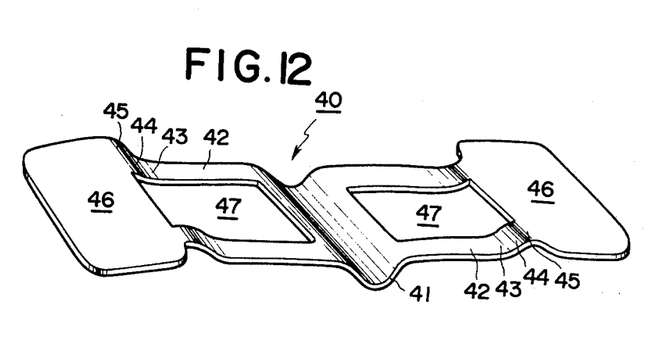
FIG. 12 is a perspective view of a friction pad supporting means.

FIGS. 11 and 12 disclose the pad-supporting means as in FIGS. 5 and 6. FIGS. 5 and 6 are a top view and a cross sectional view, partly broken, of a disc brake having a pad supporting means 40 attached thereto. FIG. 12 shows a pad supporting means 40 according to the present invention, which is made of a single elastic plate. A central concave portion 41 is provided in the central portion of the means 40, and horizontal portions 42,42 extend therefrom to the right and left, respectively. The edge portions of the horizontal portions 42,42 are provided with a pin admitting members or portions 43,43, which are adapted to admit pins 19,19 therein. The pins 19,19 extend through upper ribs 15,15 on the caliper 1. The pin admitting portions 43,43 are continuous to uprising portions 44,44. As is well known, the pins 19,19 serve to support the pads 13,14 in suspending relation. Extending from the edges 45,45 of the uprising portions 44,44 are flange portions 46,46, whose widths are larger than those of the other portions 41 to 45.

The horizontal portions 42,42 including the uprising portions 44 of the plate means 40 are formed by a punching technique, except for the side portions of the means 40. Openings 47,47 are provided therein. The operation of the openings 47,47 will be described hereinafter.

Description will be turned to the method for assembly of the brake disc according to the present invention by referring to FIGS. 5 and 6. As is well known, pads 13,14 are inserted into an opening provided in the top portion of the housing 1. Then, the pad supporting means 40 is mounted in such a manner that the central concave portion 41 thereof is in contact with the top of the pads. The pad backing plates 13',14' are located in such a manner that the holes 13",14" provided in the upper, opposite portions of the pad backing plates 13',14' secured to the pads 13,14 are maintained in concentric relation to the holes provided in the upper ribs 15,16 of the housing 1, after which pins 19,19 are inserted therein. At this time, elastic means 40 is forced to assume a position such that the pins 19,19 may be positioned above the top surfaces of the pin admitting portions 43,43 of the supporting means 40. Pins 19,19 are located with ease by means of a known means 31 so as not to drop off.

In the prior art pad supporting means made of a flat plate it is difficult to forcibly place the elastic means 40, because of its high rigidity. However, according to the present invention, openings 47,47 are provided in the horizontal portions 42,42, so that means 40 may be less rigid, thereby facilitating a forcible attachment of the elastic means, upon assembly. More particularly, one of the pins 19,19 is fixed and then the other pin may be fixed with a slight force, thereby eliminating a shortcoming in that an excessively large force is required from viewpoint of rigidity, when one of pins is fixed and then the other pin is fixed. This additionally prevents an elastic deformation of an elastic body at the time of fixing the pins.

In addition, according to the present invention, the provision of openings 47,47 brings about a desired soft resiliency or elasticity for the elastic means, thereby enabling to compensate for wear in pins or holes in the pad backing plates. Accordingly, even in the event that such wear takes place, vibration of pads may be minimized, and resulting noise may be substantially completely avoided.

Still furthermore, with the aforesaid means, the central concave portion 41 acts on the pad backing plate 14', the pin admitting portions 43 act on the pins 19,19, and side portions 45,45 of the uprising portions directly act on the housing 1. As a result, even if wear takes place in one member, the means may compensate for looseness accruing from wear. The aforesaid advantages can not be expected from the prior art elastic means.

As can be seen from FIG. 5, according to the disc brake of the invention, wear in pads 13,14 may be checked through the openings 47,47, when means 40 is assembled. This permits easy observation of the pads, thereby allowing easy maintenance.

As is clear from FIGS. 5 and 6, when the pad supporting means according to the present invention is built in a disc brake, the flange portions 46,46 having wider widths completely cover the opening portions 20,20 in the housing 1, which admit exposed portions of the slide bolts 12,12, i.e., the sliding portions of the bolts. This dispenses with a special cover adapted to cover the opening portions 20,20.

The side portions 45,45 of the uprising portions according to the present invention should preferably provide a radius of curvature adapted to the upper inward, curved surfaces of the reinforcing ribs 25,25. The flange portions 46,46 should be long enough to cover up the top surfaces of the outer sides 24,24 of the housing 1. The widths and thickness of portions other than the flange portions 46,46, and the type of a material for the elastic supporting means 40 may be suitable selected by those skilled in the art.

FIG. 11 shows a view similar to that shown in FIG. 6, in which circumferentially elongated holes are provided in the pad backing plates 13', and 14'. In this case, cut-away portions 17,17 are provided in the pads 13,14 or pad backing plates 13',14', on the opposite sides thereof, while projecting portions 39,39 engageable with the aforesaid cut-away portions 17,17 are provided in the support 7. In this manner the elastic supporting means according to the present invention may support four parts such as pads, pins, housing and a supporting member, thereby presenting a more stabilized supporting condition for pads. In this case, as well, holes 13",14" may be provided in the pad backing plates, thereby facilitating assembly of the supporting means.

What is claimed is:

1. In a floating caliper type disc brake including
   a pair of brake pads for respectively engaging corresponding zones on opposite sides of a disc to be braked, said pads being subject to wear and typically requiring replacement during the normal life of the remainder of the brake;
   a fixed, bifurcated support disposed adjacent one side of said disc and having a pair of spaced arms extending outwardly beyond the circumference of said disc and providing clearance to one of said zones for one of said pads, said arms being respectively provided with guide holes having parallel axes disposed outwardly of the circumference of said disc;
   a housing having a pair of spaced caliper portions and intermediate structure extending between said caliper portions presenting a chamber within said housing for receiving said pads;
   means for shiftably mounting said housing on said support with said caliper portions on opposite sides of said disc and said support, said housing mounting means including a pair of spaced, parallel slide bolts each extending in sliding relationship through a correponding of said holes and in tension between said caliper portions;
   means for mounting each of said pads upon a corresponding caliper portion within said chamber and in facing relationship to each other and a corresponding of said zones; and
   means for shifting said one pad relative to the caliper portion upon which it is mounted and into forceful engagement with said one zone of said disc and for thereby shifting said housing relative to said support and shifting the other of said pads into opposing forceful engagement with the other of said zones of said disc;
   the improvement of which brake comprises:
   said intermediate structure of said housing includes a pair of wall portions extending between said caliper portions adjacent each of said bolts respectively, one of said wall portions of each pair thereof being displaced from its bolt in a direction generally away from the other bolt, the other of said wall portions of each pair thereof being displaced from its bolt in a direction generally toward the other bolt, whereby said wall portions prevent distortion of said housing and shifting of the axes of said bolts under the influence of normal tension in said bolts; and said other wall portions are spaced from each other a distance sufficiently greater than the corresponding dimension of said pads to permit the latter to pass therebetween, whereby an opening is provided from the outer part of said housing to said chamber therewithin for convenient movement of said pads into and out of said chamber during replacement of said pads without disassembly of said housing.

2. The invention of claim 1, wherein:

said intermediate structure of said housing further includes a further wall portion for each of said pairs of wall portions respectively extending between said caliper portions, each of said further wall portions being adjacent and displaced outwardly from the corresponding bolt and integrally interconnected at its lateral extremities with the adjacent lateral extremity of each of said wall portions of the corresponding of said pairs thereof, whereby the part of each of said bolts extending between said caliper portions is disposed within the lateral confines of said wall portions on at least three sides thereof.

3. The invention of claim 1, wherein:

said housing includes a pair of separable, abutting of sections secured together by said bolts, each of said sections including one of said caliper portions, the intermediate structure providing said wall portions being formed integrally with at least one of said caliper portions.

4. The invention of claim 3, wherein:

said sections mutually abut throughout an annular area adjacently circumscribing each of said bolts respectively.

5. The invention of claim 4, wherein:

one of said sections includes intermediate structure formed integrally therewith and having an inturned annular flange for each of said bolts respectively presenting both a flat annular surface facing the other section and a cylindrical inner surface circumscribing each of said bolts respectively, and the other of said sections includes intermediate structure formed integrally therewith and having a flat annular surface circumscribing each of said bolts respectively and of greater inner diameter than said cylindrical surface facing said one section and in abutting relationship with an outer portion of the corresponding annular surface of said one section.

6. The invention of claim 5, wherein:

said annular surfaces are perpendicular to the axes of said bolts.

7. The invention of claim 6, wherein:

said cylindrical surfaces are each concentric with the axis of the corresponding bolt.

8. The invention of claim 7, wherein:

each of said arms of said support is provided with a cylindrical sleeve portion concentric with the axis of the corresponding hole and extending into fitting relationship within the corresponding cylindrical surface on the other of said sections.

9. The invention of claim 1, wherein are provided means for connecting each of said pads directly to said other wall portions for transmitting the lateral forces exerted upon the pads during braking to said support substantially entirely through said housing and said housing mounting means.

* * * * *